United States Patent
Hoshina et al.

(10) Patent No.: US 8,895,188 B2
(45) Date of Patent: Nov. 25, 2014

(54) ELECTRODE MATERIAL, A BATTERY ELECTRODE, METHOD OF PRODUCING THEM, NONAQUEOUS ELECTROLYTE BATTERY AND BATTERY PACK

(75) Inventors: Keigo Hoshina, Yokohama (JP); Wen Zhang, Sagamihara (JP); Yasuhiro Harada, Yokohama (JP); Hiroki Inagaki, Kawasaki (JP); Norio Takami, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 484 days.

(21) Appl. No.: 13/071,018

(22) Filed: Mar. 24, 2011

(65) Prior Publication Data
US 2012/0070726 A1   Mar. 22, 2012

(30) Foreign Application Priority Data

Sep. 22, 2010   (JP) ................. 2010-212627

(51) Int. Cl.
| | | |
|---|---|---|
| *H01M 10/0564* | (2010.01) | |
| *H01M 4/04* | (2006.01) | |
| *H01M 4/60* | (2006.01) | |
| *H01M 10/0525* | (2010.01) | |
| *H01M 4/58* | (2010.01) | |
| *H01M 4/66* | (2006.01) | |
| *H01M 10/0566* | (2010.01) | |

(52) U.S. Cl.
CPC .............. *H01M 4/5825* (2013.01); *H01M 4/60* (2013.01); *H01M 4/662* (2013.01); *H01M 10/0525* (2013.01); *Y02E 60/122* (2013.01); *H01M 10/0566* (2013.01)
USPC ........................... 429/231.5; 429/213; 427/58

(58) Field of Classification Search
USPC .................... 429/213, 231.5; 427/58
See application file for complete search history.

(56) References Cited

U.S. PATENT DOCUMENTS

2011/0136006 A1* 6/2011 Nogi et al. ............... 429/200

FOREIGN PATENT DOCUMENTS

| | | |
|---|---|---|
| JP | 2001-57237 | 2/2001 |
| JP | 2001-283908 | 10/2001 |
| JP | 2007-149648 | 6/2007 |
| JP | 2008-34368 | 2/2008 |

(Continued)

OTHER PUBLICATIONS

TiO2(B) as a promising high potential negative electrode for large size lithium ion batteries, Inaba et al, 2008, Elsevier, p. 580-584.*

(Continued)

*Primary Examiner* — Ula C Ruddock
*Assistant Examiner* — Frank Chernow
(74) *Attorney, Agent, or Firm* — Oblon, Spivak, McClelland, Maier & Neustadt, L.L.P.

(57) ABSTRACT

According to one embodiment, there is provided an electrode material. The electrode material includes an active material which includes a titanium oxide compound having a monoclinic titanium dioxide crystal structure. The electrode material further includes a compound which exists on the surface of the active material and has a trialkylsilyl group represented by the formula (I).

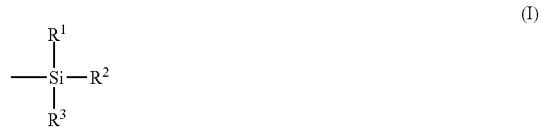

wherein $R^1$, $R^2$ and $R^3$, which may be the same or different, respectively represent an alkyl group having 1 to 10 carbon atoms.

7 Claims, 4 Drawing Sheets

(56) References Cited

FOREIGN PATENT DOCUMENTS

| JP | 2008-91327 | 4/2008 |
|---|---|---|
| JP | 2008-117625 | 5/2008 |
| JP | 2008-186803 | 8/2008 |
| JP | 2010-55855 | 3/2010 |
| JP | 2010-199043 | 9/2010 |
| WO | WO 2009/110490 A1 | 9/2009 |

OTHER PUBLICATIONS

René Marchand, et al., "TiO$_2$(B) A New Form of Titanium Dioxide and the Potassium Octatitanate K$_2$Ti$_8$O$_{17}$", Material Research Bulliten, vol. 15, 1980, 15, pp. 1129-1133.*

U.S. Appl. No. 13/197,303, filed Aug. 3, 2011, Harada et al.
Office Action issued Dec. 4, 2012 in Japanese Patent Application No. 2010-212627 (with English translation).
Office Action issued Mar. 5, 2013 in Japanese Application No. 2010-212627 (With English Translation).
Tsutomu Ohzuku, et al., "Electrochemistry of Anatase Titanium Dioxide in Lithium Nonaqueous Cells", Journal of Power Sources, 14, 1985, pp. 153-166.
U.S. Appl. No. 13/053,913, filed Mar. 22, 2011, Inagaki, et al.
Office Action issued Jul. 2, 2013 in Japanese Application No. 2010-212627 (With English Translation).

* cited by examiner

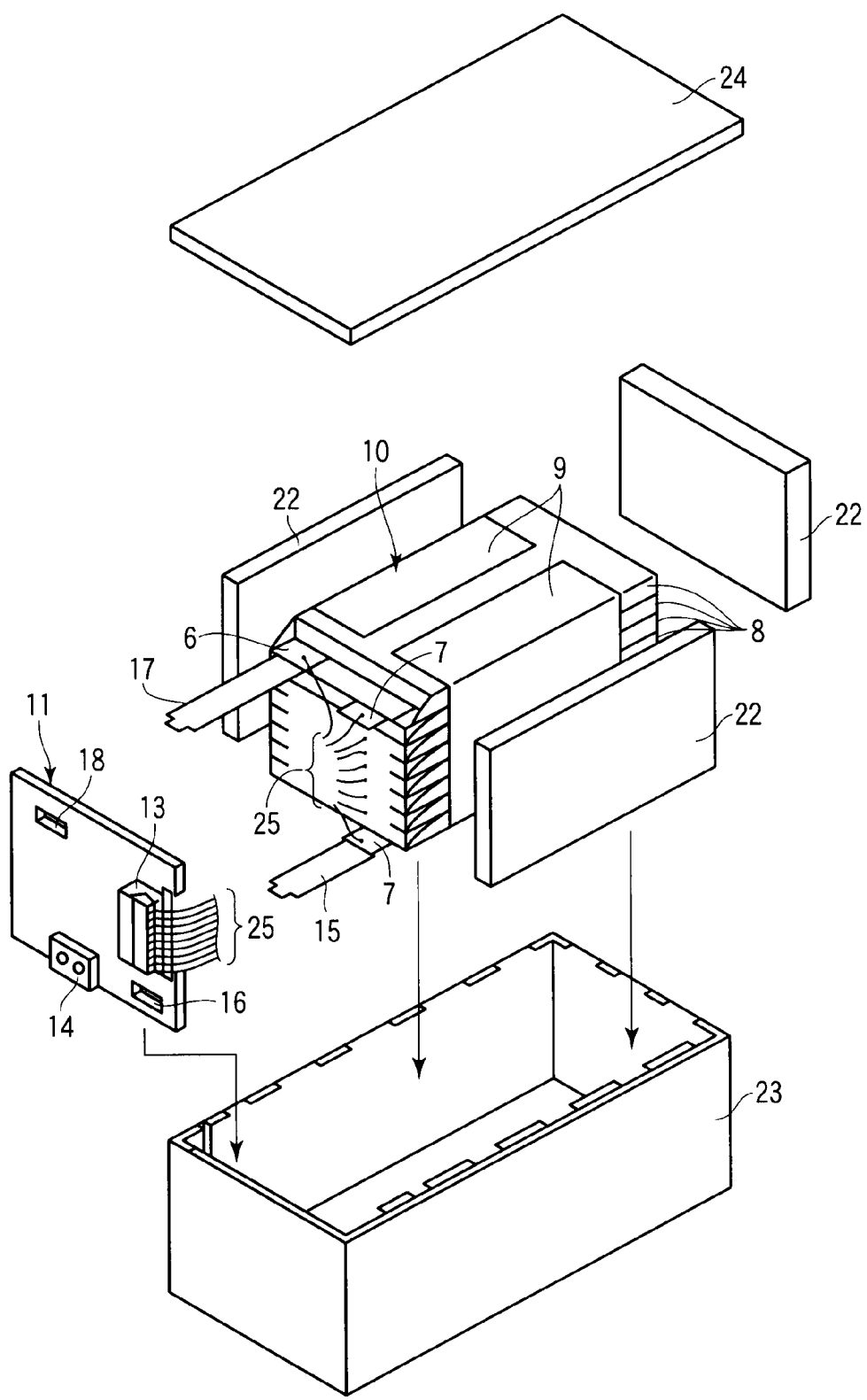
F I G. 3

ELECTRODE MATERIAL, A BATTERY ELECTRODE, METHOD OF PRODUCING THEM, NONAQUEOUS ELECTROLYTE BATTERY AND BATTERY PACK

CROSS-REFERENCE TO RELATED APPLICATIONS

This application is based upon and claims the benefit of priority from Japanese Patent Application No. 2010-212627, filed Sep. 22, 2010; the entire contents of which are incorporated herein by reference.

FIELD

Embodiments described herein relate generally to an electrode material, a battery electrode, a method of producing an electrode material, a method of producing a battery electrode, a nonaqueous electrolyte battery and a battery pack.

BACKGROUND

A nonaqueous electrolyte battery using titanium oxide as the negative electrode has less possibility of the generation of lithium dendrite than a battery using a carbonaceous material because titanium oxide has a higher Li-absorbing and releasing potential than that of the carbonaceous material. Also, titanium oxide is resistant to thermorunaway because titanium oxide is ceramics. This is the reason why a nonaqueous electrolyte battery using titanium oxide as the negative electrode is highly safe. Especially, a spinel type lithium titanate having spinel structure is not varied in volume by a charge-discharge reaction and is therefore a promising material as a negative electrode active material having excellent cycle performance and high safety. However, a nonaqueous electrolyte battery using titanium oxide has the problem that it has a low energy density. For example, the theoretical capacity of titanium dioxide having an anatase structure is about 160 mAh/g and the theoretical capacity of lithium-titanium complex oxide having a spinel structure such as $Li_4Ti_5O_{12}$ is about 170 mAh/g.

In light of this situation, much attention is now focused on a titanium oxide compound having a monoclinic titanium dioxide crystal structure. The reversible capacity of the titanium oxide compound having a monoclinic titanium dioxide crystal structure is about 240 mAh/g which is a significantly higher than those of other titanium oxide compounds.

However, when the titanium oxide compound having a monoclinic titanium dioxide crystal structure is used as the negative electrode, this poses a problem concerning a reduced cycle life.

BRIEF DESCRIPTION OF THE DRAWINGS

FIG. 3 is an exploded perspective view of a battery pack of an embodiment.

DETAILED DESCRIPTION

Figure 1:
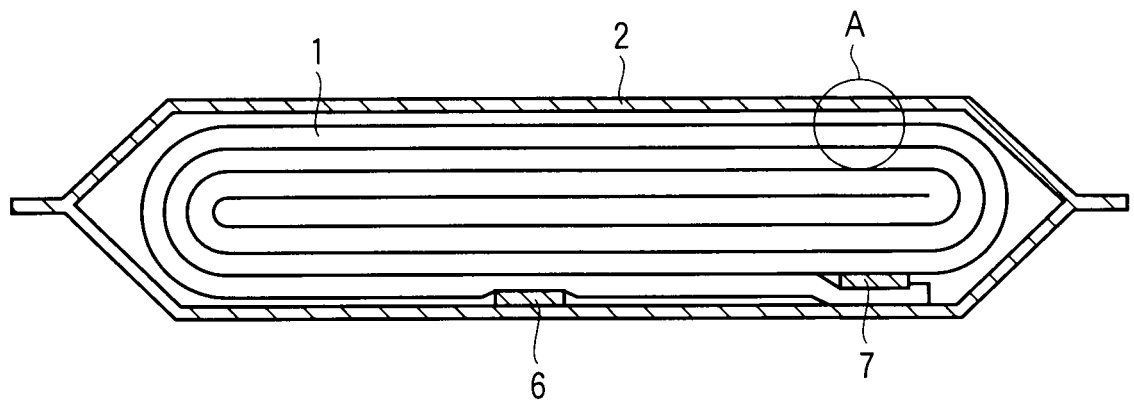
FIG. 1 is a typical sectional view of a thin type nonaqueous electrolyte battery of an embodiment.

In general, according to one embodiment, there is provided an electrode material. The electrode material comprises an active material comprising a titanium oxide compound having a monoclinic titanium dioxide crystal structure. The electrode material further comprises a compound which exists on the surface of the active material and has a trialkylsilyl group represented by the formula (I).

wherein $R^1$, $R^2$ and $R^3$, which may be the same or different, respectively represent an alkyl group having 1 to 10 carbon atoms.

According to another embodiment, there is provided a method of producing an electrode material, the method comprising dipping particle of a titanium oxide compound having a monoclinic titanium dioxide crystal structure in a solution of a compound with a trialkylsilyl group represented by the above formula (I) and separating the particle of the titanium oxide compound to which the above compound with a trialkylsilyl group is adhere from the solution.

According to another embodiment, there is provided a battery electrode comprising an active material comprising a titanium oxide compound having a monoclinic titanium dioxide crystal structure; and a compound with a trialkylsilyl group represented by the formula (I).

According to another embodiment, there is provided a method of producing a battery electrode, the method comprising preparing a slurry by dispersing an active material comprising a titanium oxide compound having a monoclinic titanium dioxide crystal structure and a compound with a trialkylsilyl group represented by the formula (I) in a solvent.

According to a still another embodiment, there is provided a nonaqueous electrolyte battery comprising a negative electrode, a positive electrode and a nonaqueous electrolyte. The negative electrode comprises an active material comprising a titanium oxide compound having a monoclinic titanium dioxide crystal structure. The above nonaqueous electrolyte comprises the compound having a trialkylsilyl group represented by the above formula (I).

According to a still another embodiment, there is provided a battery pack comprising the above nonaqueous electrolyte battery.

The crystal structure of the monoclinic titanium dioxide belongs primarily to the space group C2/m, showing a tunnel structure. Here, the crystal structure of monoclinic titanium dioxide is referred to as $TiO_2(B)$. Also, the titanium oxide compound having a crystal structure of monoclinic titanium dioxide is referred to as a titanium oxide compound having a $TiO_2(B)$ structure. Incidentally, the detailed crystal structure of $TiO_2(B)$ is described in R. Marchand, L. Brohan, M. Tournoux, Material Research Bulletin 15, 1129 (1980). The titanium oxide compound having a $TiO_2(B)$ structure may be represented by the formula $Li_xTiO_2$ ($0 \leq x \leq 1$). In this case, x in the above formula is varied between 0 and 1 by a charge-discharge reaction.

It is considered that the theoretical capacity of a battery can be raised by using the titanium oxide compound having a $TiO_2(B)$ structure as the active material because the titanium oxide compound has a high theoretical capacity.

However, the titanium oxide compound having a $TiO_2(B)$ structure is a solid acid and has a solid acid point and a hydroxyl group on its surface and therefore has high reactivity with a nonaqueous electrolyte. For this, in a battery using the titanium oxide compound having a $TiO_2(B)$ structure as the negative electrode active material, the nonaqueous electrolyte is decomposed along with a charge-discharge reaction, leading to the formation of excess inorganic or organic coating film on the negative electrode. This results in the increased resistance and reduced cycle life.

In a battery using a carbonaceous material or a spinel type lithium titanate as the negative electrode active material, a side-reaction between the negative electrode and the nonaqueous electrolyte can be limited by adding vinylene carbonate to the nonaqueous electrolyte. In a battery like this, this vinylene carbonate is reduction-decomposed on the negative electrode to form a stable coating film on the negative electrode, whereby the excess formation of a coating film can be limited. However, in the battery using the titanium oxide compound having a $TiO_2(B)$ structure as the negative electrode active material, the side-reaction between the negative electrode and the nonaqueous electrolyte cannot be limited even if vinylene carbonate is added, so that the formation of a coating film cannot be limited. There are therefore problems concerning increase in resistance and reduction in cycle life.

The inventors have found that the increase in the resistance of a battery can be limited by adding a compound having a trialkylsilyl group in any one of the active material, electrode and nonaqueous electrolyte. This reason is considered that excess formation of a coating film is limited since a stable coating film containing a trialkylsilyl group is produced. Hereinafter, each embodiment will be explained in detail.

First Embodiment

According to this embodiment, there is provided an electrode material comprising an active material comprising a titanium oxide compound having a $TiO_2(B)$ structure and a compound which exists on the surface of the active material and has a trialkylsilyl group represented by the formula (I).

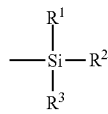

(I)

In the formula (I), $R^1$, $R^2$ and $R^3$, which may be the same or different, respectively represent an alkyl group having 1 to 10 carbon atoms.

In such an electrode material, the compound having a trialkylsilyl group is preferably existed in the surface of primary particle of the titanium oxide compound. Here, the surface of the primary particle of the titanium oxide compound includes the inside surface of pores existing on the surface of the primary particle.

The electrode material according to this embodiment is comprised as the active material in the electrode of a battery. In such a battery, the nonaqueous electrolyte is decomposed during an initial charge and the subsequent charge-discharge, leading to the formation of a coating film on the surface of the electrode material. However, since the compound having a trialkylsilyl group exists in the electrode material, a coating film containing a trialkylsilyl group is formed. This coating film containing a trialkylsilyl group is stable and limits a side-reaction between the titanium oxide compound and the nonaqueous electrolyte, which makes it possible to limit the decomposition of the nonaqueous electrolyte. Excess formation of a coating film is thereby limited, so that an increase in the resistance of the battery can be limited, with the result that the cycle life can be improved. An effect like this can be obtained by using a compound having a trialkylsilyl group which has an alkyl group having 10 or less carbon atoms. The alkyl group of the trialkylsilyl group is preferably one having 1 to 3 carbon atoms.

The existence of the trialkylsilyl group on the surface of the electrode material can be detected by the time-of-flight type secondary ion mass-analysis method. Also, whether the trialkylsilyl group is contained or not in the coating film formed on the surface of the electrode material can be determined by analyzing the surface of the electrode material after charge-discharge according to the time-of-flight type secondary ion mass-analysis method.

In the time-of-flight type secondary ion mass-analysis method, for example, primary ions (for example, $Bi_3^{++}$) are applied to the surface of a sample under vacuum. Then, positively or negatively charged secondary ions are emitted from the surface of the sample. These emitted secondary ions are detected by a detector positioned at a fixed distance from the sample. At this time, the time during which the secondary ions accelerated by the same energy reach the detector is a function of the mass. For this, in the time-of-flight type secondary ion mass-analysis method, the mass-distribution of secondary ions and organic materials and inorganic materials existing on the surface of the sample can be identified. Also, the amount of each material can be compared from its peak intensity.

In the electrode material according to the embodiment, the peak intensity ratio ($I_1/I_2$) is preferably 1 or more when the surface of the electrode material is measured by the time-of-flight type secondary mass-analysis method. Here, $I_1$ is the peak intensity of the peak derived from $Si(CH_3)_3^+$, and $I_2$ is the peak intensity of the peak derived from $Ti^+$. The existence of the trialkylsilyl group in the electrode material increases the ratio ($I_1/I_2$) of peak intensities to 1 or more. Also, the existence of the trialkylsilyl group in the coating film formed after charge-discharge also ensures a peak intensity ratio ($I_1/I_2$) of 1 or more. Using the electrode material having a peak intensity ratio ($I_1/I_2$) of 1 or more, the increase of the resistance of the battery is more limited and the cycle life is more improves. The peak intensity ratio ($I_1/I_2$) is preferably 10 or less because an excessive existence of the trialkylsilyl group is a cause of increase in resistance.

The compound containing the trialkylsilyl group is, though not limited to, preferably at least one selected from phosphoric acid compounds containing the trialkylsilyl group and boric acid compounds containing the trialkylsilyl group. Examples of such a compound include tris(trimethylsilyl) borate, tris(trimethylsilyl) phosphate, tris(triethylsilyl) borate, tris(triethylsilyl) phosphate, tris(triisopropylsilyl) borate, tris(triisopropylsilyl) phosphate, tris(dimethylethylsilyl) borate, tris(dimethylethylsilyl) phosphate, tris(butyldimethylsilyl) borate, and tris(butyldimethylsilyl) phosphate. Tris(trimethylsilyl) borate is preferably used. (Time-of-flight type secondary ion mass-analysis method)

The measuring method using the time-of-flight type mass-analysis method will be explained. The condition of the measurement is as follows: type of primary ions: $Bi_3^{++}$, primary ion energy: 25 kV, pulse width: 4.7 ns, bunching: performed, neutralization of charge: non-neutralized, and degree of vacuum in measurement: $4 \times 10^{-7}$ Pa. When only the active material is measured, the active material is included in a resin, which is subjected to an argon ion milling device to carry out sectional processing. The processed sample subjected to the measurement. In the case of measuring the electrode, the electrode may be used as the sample. In the case of measuring the electrode, the battery is dismounted to take the electrode out of the battery, and the electrode is measured while preventing the electrode from being exposed, to the utmost.

(Specific Surface Area)

The specific surface area of the titanium oxide compound having a TiO$_2$(B) structure is preferably 5 m$^2$/g to 100 m$^2$/g. When the specific surface area is 5 m$^2$/g or more, lithium ion-absorbing/releasing sites can be amply secured, enabling the production of a higher capacity battery. When the specific surface area is 100 m$^2$/g or less, coulomb efficiency in charge-discharge can be improved.

(Powder X-Ray Diffraction)

Whether the titanium oxide compound has a TiO$_2$(B) structure or not can be identified by powder X-ray diffraction using Cu—Kα as the light source.

The powder X-ray diffraction measurement may be carried out in the following manner. First, an object sample is ground until the average particle diameter reaches about 5 μm. The average particle diameter can be found by the laser diffraction method. The ground sample is filled in a holder part which is formed on a glass sample plate and has a depth of 0.2 mm. At this time, much care is necessary to fill the holder part fully with the sample. Also, special care should be taken to avoid cracking and formation of voids caused by insufficient filling of the sample. Then, a separate glass plate is used to smooth the surface of the sample by sufficiently pressing the separate glass plate against the sample. Much care is taken to prevent the occurrence of cracks and voids by a lack of the sample to be filled, thereby preventing any rise and dent from the basic plane of the glass holder. Then, the glass plate filled with the sample is mounted on the powder X-ray diffractometer to obtain a diffraction pattern by using Cu—Kα rays. Because TiO$_2$(B) generally has low crystallinity, some samples have weak peak intensities of X-ray diffraction diagram in the powder X-ray measurement so that any one of the peak intensities is measured with difficulty. However, it is only required to observe the peak derived from monoclinic titanium dioxide belonging to the space group C2/m.

According to the embodiment, the electrode material which can realize a nonaqueous electrolyte battery limited in the increase of resistance and improved in cycle life can be provided Second Embodiment Next, a method of producing the electrode material described in the first embodiment will be explained. The method comprises dipping particle of a titanium oxide compound having a TiO$_2$(B) structure in a solution of a compound having a trialkylsilyl group represented by the above formula (I) and separating the particle of the titanium oxide compound to which the above compound having a trialkylsilyl group is adhere from the solution.

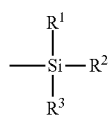
(I)

wherein, R$^1$, R$^2$ and R$^3$, which may be the same or different, respectively represent an alkyl group having 1 to 10 carbon atoms.

To mention in more detail, particle of titanium oxide compound having a TiO$_2$(B) structure is dipped in a solution of a compound having a trialkylsilyl group to impregnate the titanium oxide compound particle with the solution. At this time, the process may be carried out under vacuum to promote the penetration of the solution into pores of the titanium oxide compound. Then, the titanium oxide compound is separated by, for example, filtration, followed by drying. Alternately, the titanium oxide compound may be separated by vaporizing the solution by a hot plate or the like. By this treatment, titanium oxide compound particle to which the compound having a trialkylsilyl group is adhered can be obtained.

Examples of the compound having a trialkylsilyl group include those described in the first embodiment. The content of the compound having a trialkylsilyl group may be adjusted by changing the concentration of the solution of the compound having a trialkylsilyl group and impregnation time.

According to the embodiment, a method of producing an electrode material which can realize a nonaqueous electrolyte battery limited in the increase of resistance and improved in cycle life can be provided.

Third Embodiment

According to this embodiment, there is provided a battery electrode comprising an active material containing a titanium oxide compound having a TiO$_2$(B) structure and a compound having a trialkylsilyl group represented by the formula (I).

wherein, R$^1$, R$^2$ and R$^3$, which may be the same or different, respectively represent an alkyl group having 1 to 10 carbon atoms.

Such an electrode may have, for example, a constitution in which an active material layer comprising an active material containing a titanium oxide compound having a TiO$_2$(B) structure is formed on a current collector. The compound having a trialkylsilyl group may be comprised in the active material layer and is preferably dispersed in the active material layer.

The initial charge and the subsequent charge-discharge are accompanied by the decomposition of the nonaqueous electrolyte, leading to the formation of a coating film on the surface of the electrode. However, the presence of the compound having a trialkylsilyl group in the electrode enables the formation of a coating film containing a trialkylsilyl group. The coating film containing a trialkylsilyl group is stable, and can limit a side-reaction between the titanium oxide compound and the nonaqueous electrolyte, which makes it possible to limit the decomposition of the nonaqueous electrolyte. Excess formation of a coating film is thereby limited, and increase in the resistance of the battery can be limited, with result that the cycle life can be improved.

In the electrode according to this embodiment, the coating film in which a trialkylsilyl group is contained is not limited to the coating film formed on the surface of the electrode but the coating film formed on the surface of the active material comprised in the electrode.

The existence of the trialkylsilyl group in the electrode may be detected by the time-of-flight type secondary ion mass-analysis method. Also, the existence of the trialkylsilyl group in the coating film formed on the surface of the electrode can be detected by observing the surface of the electrode after charge-discharge according to the time-of-flight type secondary ion mass-analysis method.

In the electrode according the embodiment, the peak intensity ratio ($I_1/I_2$) is preferably 1 or more when the surface of the electrode is measured by the time-of-flight type secondary mass-analysis method. Here, $I_1$ is the peak intensity of the peak derived from $Si(CH_3)_3{}^+$, $I_2$ is the peak intensity of the peak derived from $Ti^+$. The existence of the trialkylsilyl group in the electrode increases the ratio of peak intensities to 1 or more. The existence of the trialkylsilyl group in the coating film formed after charge-discharge also increases the ratio of peak intensities to 1 or more. The electrode having a peak intensity ratio ($I_1/I_2$) of 1 or more is more limited in the increase of the resistance of the battery and is more improved in cycle life. In this case, the peak intensity ratio ($I_1/I_2$) is preferably 10 or less because an excessive existence of the trialkylsilyl group is a cause of increase in resistance.

Examples of the compound having a trialkylsilyl group include those described in the first embodiment.

The electrode in this embodiment may be used either as the positive electrode or as the negative electrode. Preferably it is used as the negative electrode.

Also, the electrode material described in the first embodiment may be used as the active material comprised in the electrode.

According to the above embodiment, an electrode which can realize a nonaqueous electrolyte battery limited in the increase of resistance and improved in cycle life can be provided.

Fourth Embodiment

Next, a method of producing the electrode described in the third embodiment will be explained. This method comprises preparing a slurry by dispersing an active material comprising a titanium oxide compound having a $TiO_2(B)$ structure and a compound having a trialkylsilyl group represented by the formula (I) in a solvent.

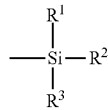
(I)

wherein, $R^1$, $R^2$ and $R^3$, which may be the same or different, respectively represent an alkyl group having 1 to 10 carbon atoms.

Then, the obtained slurry is applied to one or both surfaces of a current collector, dried and pressed, thereby enabling the production of an electrode. When the slurry is prepared, other components such as a conductive agent and a binder may be added to the solution.

For example, N-methylpyrrolidone (NMP) or water may be used as the solvent.

As the compound having a trialkylsilyl group, those described in the first embodiment may be used.

For example, an aluminum foil or an aluminum alloy foil may be used as the current collector, though the material of the current collector is not limited to these foils.

The method of producing an electrode in this embodiment may be used to any of the positive electrode and negative electrode. It is preferably used to produce the negative electrode. The solvent, compound having a trialkylsilyl group, current collector, conductive agent, and binder are respectively selected from the candidate which suitable to the positive or negative electrodes.

In an example of the production of the negative electrode, for example, a powder of a titanium oxide compound having a $TiO_2(B)$ structure, tris(trimethylsilyl) phosphate solution, acetylene black, and polyvinylidene fluoride are added to and mixed with a NMP solvent to produce a slurry. This slurry is applied to the current collector and dried to remove NMP, thereby enabling the production of a negative electrode.

According to the embodiment, a method of producing an electrode which can attain a nonaqueous electrolyte battery which is limited in the increase of resistance and improved in cycle life can be provided.

Fifth Embodiment

In the fifth embodiment, a nonaqueous electrolyte battery comprising a negative electrode, a positive electrode, a nonaqueous electrolyte, a separator and a container is provided. In this embodiment, the negative electrode comprises a titanium oxide compound having a $TiO_2(B)$ structure. Also, the nonaqueous electrolyte comprises a compound having a trialkylsilyl group represented by the formula (I).

wherein, $R^1$, $R^2$ and $R^3$, which may be the same or different, respectively represent an alkyl group having 1 to 10 carbon atoms.

Hereinafter, the negative electrode, positive electrode, nonaqueous electrolyte, separator, and container will be explained in detail.

1) Negative Electrode

The negative electrode comprises a current collector, a negative electrode layer (namely, a negative electrode active material-containing layer). The negative electrode layer is formed on one or both surfaces of the current collector and comprises an active material, a conductive agent, and a binder.

As the active material, a titanium oxide compound having a $TiO_2(B)$ structure is used. The titanium oxide compound having a $TiO_2(B)$ structure may be used alone, or it may be used in combination with other titanium-containing oxides such as lithium titanate having a spinel structure and titanium oxide having an anatase structure.

The conductive agent serves to improve current-collecting performance and to restrain the contact resistance between the active material and the current collector. Examples of the conductive agent include acetylene black, carbon black, graphite, carbon nano-fiber and carbon nanotube.

The binder serves to bind the active material, conductive agent and current collector with each other. Examples of the binder include a polytetrafluoroethylene (PTFE), polyvinylidene fluoride (PVdF), fluoro-rubber, and styrene-butadiene rubber.

The active material, conductive agent, and binder in the negative electrode layer are preferably blended in ratios of 70% to 96% by mass, 2% to 28% by mass and 2% to 28% by mass respectively. When the amount of the conductive agent is 2% by mass or more, the current collecting performance of the negative electrode layer can be improved. Also, when the amount of the binder is 2% by mass or more, the binding strength between the negative electrode layer and the current collector can be improved. On the other hand, the amounts of the conductive agent and binder are respectively preferably 28% by mass or less with the view of developing a high-capacity battery.

The current collector is preferably electrochemically stable in a potential range higher than 1.0 V and is preferably an aluminum foil or an aluminum alloy foil containing at least one element selected from Mg, Ti, Zn, Mn, Fe, Cu, and Si.

The negative electrode can be manufactured by suspending, for example, the active material, conductive agent and binder in a proper solvent to prepare slurry, by applying this slurry to the surface of the current collector and by drying the slurry, followed by pressing. The negative electrode may also be manufactured by forming a pellet essentially consisting of the active material, conductive agent and binder to produce a negative electrode layer-forming material, which is then formed on the current collector.

2) Positive Electrode

The positive electrode comprises a current collector and a positive electrode layer (namely, positive electrode active material-containing layer). The positive electrode layer is formed on one or both surfaces of the current collector and contains an active material, a conductive agent and a binder.

As the active material, for example, oxides or sulfides may be used.

Examples of the oxides include oxides having a layer structure, such as, lithium-cobalt complex oxide (for example, $Li_xCoO_2$), lithium-nickel-cobalt complex oxide (for example, $Li_xNi_{1-y}Co_yO_2$), lithium-nickel-manganese complex oxide (for example, $Li_xNi_{1-y}Mn_yO_2$), and lithium-nickel-cobalt-manganese complex oxide (for example, $Li_xNi_{1-y-z}Co_yMn_zO_2$); oxides having a spinel structure, such as, lithium-manganese complex oxide (for example, $Li_xMn_2O_4$), and lithium-manganese-nickel complex oxide ($Li_xMn_{2-y}Ni_yO_4$); and compounds having an olivine structure, such as, lithium iron phosphate (for example, $Li_xFePO_4$), lithium iron phosphate manganese complex oxide (for example, $Li_xFe_{1-y}Mn_yPO_4$) and lithium cobalt phosphate (for example, $Li_xCoPO_4$). Here, x and y preferably satisfy the following equations: $0<x\leq1$, $0\leq y\leq1$ and $0\leq z\leq1$. As the active material, these compounds may be used alone or in combinations of two or more.

The specific surface area of the positive electrode active material is preferably 0.1 $m^2/g$ to 10 $m^2/g$. When the specific surface area is 0.1 $m^2/g$ or more, the lithium ion-absorption/releasing sites can be sufficiently secured. When the specific surface area is 10 $m^2/g$ or less, the positive electrode active material is easily handled in industrial production processes, ensuring good charge-discharge cycle performance.

The conductive agent improves the current collecting ability of the active material and reduces the contact resistance between the active material and the current collector. Examples of the conductive agent include carbonaceous materials such as acetylene black, carbon black, graphite, carbon nano-fiber and carbon nanotube.

The binder serves to bind the active material, conductive agent and current collector with each other. Examples of the binder include a polytetrafluoroethylene (PTFE), polyvinylidene fluoride (PVdF) and fluoro-rubber.

The active material, conductive agent and binder in the positive electrode layer are preferably formulated in ratios of 80% to 95% by mass, 3% to 18% by mass and 2% to 17% by mass respectively. The conductive agent can produce the aforementioned effect by blending it in an amount of 3% by mass or more. The decomposition of the nonaqueous electrolyte on the surface of the conductive agent can be reduced by blending it in an amount of 18% by mass or less when the nonaqueous electrolyte is stored at high temperatures. When the amount of the binder is designed to be 2% by mass or more, sufficient strength of the positive electrode can be obtained. When the amount of the binder is 17% by mass or less, the amount of the binder to be formulated as an insulating material in the positive electrode can be reduced, making it possible to reduce internal resistance.

The current collector is preferably made of an aluminum foil or aluminum alloy foil containing at least one element selected from Mg, Ti, Zn, Mn, Fe, Cu and Si.

The positive electrode can be manufactured by suspending, for example, the active material, conductive agent and binder in a proper solvent to prepare slurry, by applying this slurry to the surface of the positive electrode current collector and by drying the slurry, followed by pressing. The positive electrode may also be manufactured by forming a pellet essentially consisting of the active material, conductive agent and binder to produce a positive electrode layer, which is formed on the current collector.

3) Nonaqueous Electrolyte

For example, a liquid nonaqueous electrolyte prepared by dissolving an electrolyte in an organic solvent or a gel-like nonaqueous electrolyte prepared by making a complex of a liquid nonaqueous electrolyte and a polymer material may be used as the nonaqueous electrolyte. In any case, the nonaqueous electrolyte comprises the compound having a trialkylsilyl group represented by the formula (I).

Examples of the electrolyte contained in the liquid nonaqueous electrolyte include lithium salts such as lithium perchlorate ($LiClO_4$), lithium hexafluorophosphate ($LiPF_6$), lithium tetrafluoroborate ($LiBF_4$), hexafluoro arsenic lithium ($LiAsF_6$), lithium trifluoromethasulfonate ($LiCF_3SO_3$), and bistrifluoromethylsulfonylimide lithium [$LiN(CF_3SO_2)_2$], or mixtures of these compounds. The electrolyte is preferably one which is scarcely oxidized at a high potential and $LiPF_6$ is most preferable. The electrolyte is preferably dissolved in an organic solvent in a concentration of 0.5 M to 2.5 M.

Examples of the organic solvent include cyclic carbonates such as propylene carbonate (PC), ethylene carbonate (EC) and vinylene carbonate; chain carbonates such as diethyl carbonate (DEC), dimethyl carbonate (DMC) and methylethyl carbonate (MEC); cyclic ethers such as tetrahydrofuran (THF), 2-methyltetrahydrofuran (2MeTHF) and dioxolan (DOX); chain ethers such as dimethoxyethane (DME) and diethoxyethane (DEE); γ-butyrolactone (GBL), acetonitrile (AN) and sulfolan (SL). These organic solvents may be used either alone or in combinations of two or more.

Examples of the polymer material include a polyvinylidene fluoride (PVdF), polyacrylonitrile (PAN) and polyethylene oxide (PEO).

Examples of the compound having a trialkylsilyl group represented by the formula (I) and being comprised in the nonaqueous electrolyte include those described in the first embodiment.

The content of the compound having a trialkylsilyl group in the nonaqueous electrolyte is preferably 0.02% to 3% by mass based on the total mass of the nonaqueous electrolyte. When the content is 0.02% by mass or more, the coating film containing a trialkylsilyl group is formed on the electrode, thereby obtaining a side-reaction limiting effect. When the content is 3% by mass or less, excess formation of a coating film is prevented. The content is more preferably 0.5% to 2% by mass.

Examples of the nonaqueous electrolyte include a solution prepared by dissolving 1 M of $LiPF_6$ and 1% by mass of tris(trimethylsilyl) phosphate in a mixed solvent comprising ethylene carbonate and diethyl carbonate in a ratio by volume of 1:2.

4) Separator

The separator may be formed of, porous films containing, for example, a polyethylene, polypropylene, cellulose or polyvinylidene fluoride (PVdF) or nonwoven fabrics made of synthetic resins. Porous films formed of a polyethylene or polypropylene is preferably used. These porous films can melt at a fixed temperature to cut off current and can therefore improve safety.

5) Container

A container made of a laminate film 0.2 mm or less in thickness or a metal container 0.5 mm or less in thickness may be used as the container. The metal container preferably has a thickness of 0.2 mm or less.

Examples of the shape of the container include a flat type (thin type), angular type, cylinder type, coin type and button type. As the container, an appropriate one may be selected corresponding to the dimension of the battery. Containers for miniature batteries to be mounted in, for example, mobile electronic devices or package materials for large batteries to be mounted on two-wheel or four-wheel vehicles are used.

As the laminate film, a multilayer film prepared by interposing a metal layer between resin layers may be used. The metal layer is preferably formed of an aluminum foil or aluminum alloy foil to reduce the weight of the battery. For example, polymer materials such as a polypropylene (PP), polyethylene (PE), nylon and polyethylene terephthalate (PET) may be used for the resin layer. The laminate film can be molded into a desired shape by sealing through thermal fusion.

The metal container is made of aluminum, an aluminum alloy or the like. The aluminum alloy is preferably an alloy containing one or more elements selected from magnesium, zinc, and silicon. When the alloy contains transition metals such as iron, copper, nickel and chromium, the amount of the transition metals is preferably 100 ppm by mass or less.

The nonaqueous battery mentioned above comprises compound having a trialkylsilyl group, consequently, a coating film containing a trialkylsilyl group is formed on the surface of the electrode and active material by initial charge and subsequent charge-discharge. As mentioned above, the coating film containing a trialkylsilyl group is stable and limits a side-reaction between the titanium oxide compound and the nonaqueous electrolyte, which makes it possible to limit the decomposition of the nonaqueous electrolyte. Excess formation of a coating film is thereby limited, so that an increase in the resistance of the battery can be limited, with the result that the cycle life can be improved.

The existence of the trialkylsilyl group on the coating film formed after charge-discharge can be detected by the time-of-flight type secondary ion mass-analysis method. The measurement may be carried out in any one of the coating film formed on the surface of the electrode and the coating film formed on the surface of the active material. It is convenient to measure the surface of the electrode. Hereafter the case of measuring the surface of the electrode will be explained, but the coating film formed on the surface of the active material can be measured in the same manner.

In the nonaqueous electrolyte battery according to the embodiment, the peak intensity ratio ($I_1/I_2$) is preferably 1 or more when the surface of the electrode material is measured by the time-of-flight type secondary mass-analysis method.

Here, $I_1$ is the peak intensity of the peak derived from $Si(CH_3)_3^+$, and $I_2$ is the peak intensity of the peak derived from $Ti^+$. The existence of the trialkylsilyl group in the coating film formed on the electrode increases the ratio of peak intensities to 1 or more. The nonaqueous electrolyte battery having a peak intensity ratio ($I_1/I_2$) of 1 or more is more limited in the increase of the resistance of the battery and is more improved in cycle life. The peak intensity ratio ($I_1/I_2$) is preferably 10 or less because an excessive existence of the trialkylsilyl group is a cause of increase in resistance.

Figure 2:
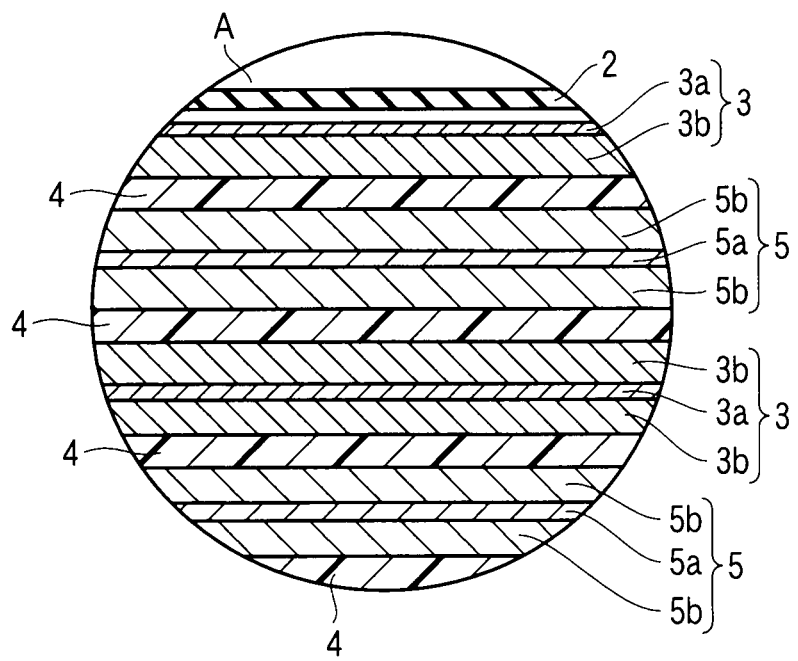
FIG. 2 is an enlarged sectional view of the part A in FIG. 1.

Next, as an example of the nonaqueous electrolyte battery according to the embodiment, a thin-type nonaqueous electrolyte battery provided with a container made of a laminate film will be explained. FIG. 1 is a typical sectional view of the thin-type nonaqueous electrolyte battery and FIG. 2 is an enlarged sectional view of the part A shown in FIG. 1. In this case, each of these drawings is a typical view for explanations and promotion of the understanding of the embodiment. Though there are parts different from an actual battery in shape, dimension and ratio, these structural designs may be properly changed taking the following explanations and known technologies into consideration.

A flat type coil electrode group 1 is accommodated in a baggy container 2 made of a laminate film obtained by interposing an aluminum foil between two resin layers. The coil electrode groups 1 having a flat form are formed by spirally coiling a laminate obtained by laminating a negative electrode 3, a separator 4, a positive electrode 5 and a separator 4 in this order from the outside and by press-molding the coiled laminate. The outermost negative electrode 3 has a structure in which as shown in FIG. 2, a negative electrode layer 3*b* is formed on one of the inside surfaces of a negative electrode current collector 3*a*. Other negative electrodes 3 each have a structure in which a negative electrode layer 3*b* is formed on each surface of the negative electrode current collector 3*a*. An active material comprised in the negative electrode layer 3*b*, comprises a titanium oxide compound having a $TiO_2(B)$ structure. In the positive electrode 5, a positive electrode layer 5*b* is formed on each surface of a positive electrode current collector 5*a*.

In the vicinity of the outer peripheral end of the coil electrode group 1, a negative electrode terminal 6 is connected to the negative electrode current collector 3*a* of the outermost negative electrode 3 and a positive electrode terminal 7 is connected to the positive electrode current collector 5*a* of the inside positive electrode 5. These negative electrode terminal 6 and positive electrode terminal 7 are externally extended from an opening part of the baggy container 2. A liquid nonaqueous electrolyte is, for example, injected from the opening part of the baggy package material 2. The opening part of the baggy package material 2 is closed by heat sealing with the negative electrode terminal 6 and positive electrode terminal 7 extended out of the opening part to thereby seal the coil electrode group 1 and liquid nonaqueous electrolyte.

The negative electrode terminal 6 is made of, for example, a material having electric stability and conductivity in a potential range from 1 V to 3 V with respect to a lithium ion metal. Examples of the material for the negative electrode terminal include aluminum and aluminum alloys containing one or more elements selected from Mg, Ti, Zn, Mn, Fe, Cu and Si. The negative electrode terminal 6 is preferably made of the same material as the negative electrode current collector 3*a* to reduce the contact resistance with the negative electrode current collector 3*a*.

The positive electrode terminal 7 is made of, for example, a material having electric stability and conductivity in a potential range from 3 V to 4.5 V with respect to a lithium ion metal. Examples of the material for the positive electrode terminal include aluminum and aluminum alloys containing one or more elements selected from Mg, Ti, Zn, Mn, Fe, Cu and Si. The positive electrode terminal 7 is preferably made of the same material as the positive electrode current collector 5a to reduce the contact resistance with the positive electrode current collector 5a.

According to the embodiment, a nonaqueous electrolyte battery can be provided which is limited in the increase of resistance and improved in cycle life.

In the nonaqueous electrolyte battery according to this embodiment, the electrode material described in the first embodiment may be used as the negative electrode active material. Alternatively, the nonaqueous electrolyte battery may use the electrode described in the third embodiment as the negative electrode. In such a nonaqueous electrolyte battery, the nonaqueous electrolyte may not include the compound having a trialkylsilyl group represented by the formula (I) though it may contain the compound. In any of these constitutions, an increase in resistance is limited, so that the nonaqueous electrolyte battery can be improved in cycle life.

Sixth Embodiment

Next, a battery pack according to a six embodiment will be explained with reference to the drawings. The battery pack comprises one or two or more of the above nonaqueous electrolyte batteries (unit cells) according to the above third embodiment. When the battery pack includes two or more unit cells, these unit cells are disposed in such a manner that they are electrically connected in series or in parallel.

Figure 4:
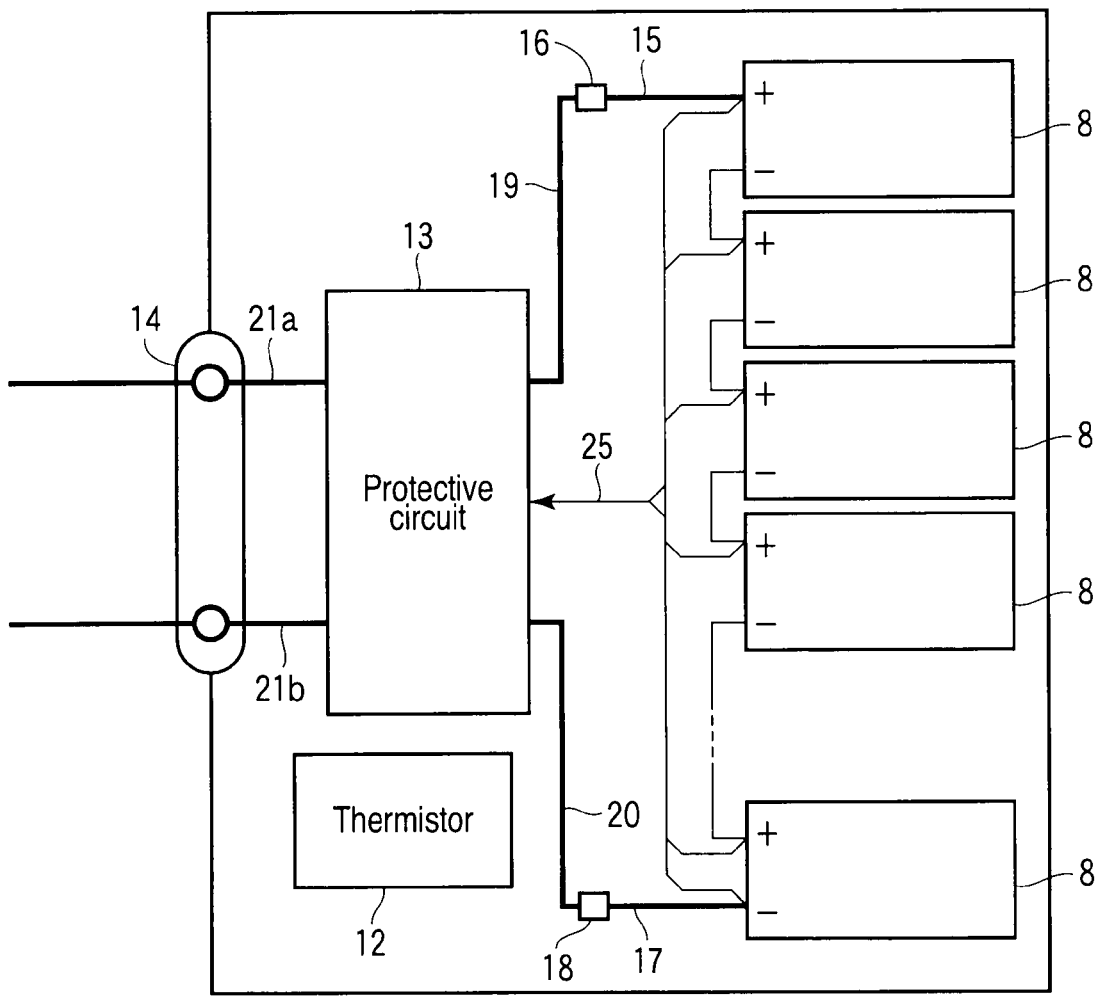
FIG. 4 is a block diagram showing an electric circuit of a battery pack of FIG. 3.

FIGS. 3 and 4 show an example of a battery pack comprising two or more flat-type unit cells. FIG. 3 is an exploded perspective view of the battery pack. FIG. 4 is a block diagram showing an electric circuit of the battery pack shown in FIG. 3.

A plurality of unit cells 8 are laminated such that the externally extended negative electrode terminals 6 and positive electrode terminals 7 are arranged in the same direction and fastened with an adhesive tape 9 to thereby configure a battery module 10. These unit cells 8 are electrically connected in series as shown in FIG. 4.

A printed wiring board 11 is disposed opposite to the side surface of the unit cell 8 from which the negative electrode terminal 6 and positive electrode terminal 7 are extended. As shown in FIG. 4, a thermistor 12, a protective circuit 13 and an energizing terminal 14 connected to external devices are mounted on the printed wiring board 11. An insulating plate (not shown) is attached to the surface of the printed wiring board 11 facing the battery module 10 to avoid unnecessary electrical connection with the wiring of the battery module 10.

A positive electrode side lead 15 is connected with the positive electrode terminal 7 positioned on the lowermost layer of the battery module 10 with its tip being inserted into a positive electrode side connector 16 of the printed wiring board 11 for electrical connection. A negative electrode side lead 17 is connected with the negative electrode terminal 6 positioned on the uppermost layer of the battery module 10 with its tip being inserted into a negative electrode side connector 18 of the printed wiring board 11 for electrical connection. These connectors 16 and 18 are connected to a protective circuit 13 through wirings 19 and 20 formed on the printed wiring board 11.

The thermistor 12 is used to detect the temperature of the unit cell 8 and the detected signals are transmitted to the protective circuit 13. The protective circuit 13 can shut off a plus side wiring 21a and minus side wiring 21b between the protective circuit 13 and the energizing terminal 14 connected to external devices in a predetermined condition. The predetermined condition means, for example, the case where the temperature detected by the thermistor 12 is a predetermined one or higher. Also, the predetermined condition means, for example, the case of detecting overcharge, overdischarge and over-current of the unit cell 8. The detections of this overcharge and the like are made for individual unit cells 8 or whole unit cells 8. When individual unit cells 8 are detected, either the voltage of the battery may be detected or the potential of the positive electrode or negative electrode may be detected. In the latter case, a lithium electrode used as a reference electrode is inserted between individual unit cells 8. In the case of FIGS. 3 and 4, a wiring 25 for detecting voltage is connected to each unit cell 8 and the detected signals are transmitted to the protective circuit 13 through these wirings 25.

A protective sheet 22 made of a rubber or resin is disposed on each of the three side surfaces of the battery module 10 excluding the side surface from which the positive electrode terminal 7 and negative electrode terminal 6 are projected.

The battery module 10 is accommodated in a receiving container 23 together with each protective sheet 22 and printed wiring board 11. Specifically, the protective sheet 22 is disposed on each inside surface in the direction of the long side and on one of the inside surfaces in the direction of the short side of the receiving container 23, and the printed wiring board 11 is disposed on the other inside surface in the direction of the short side. The battery module 10 is positioned in a space enclosed by the protective sheet 22 and the printed wiring board 11. A lid 24 is attached to the upper surface of the receiving container 23.

Here, a thermally contracting tape may be used in place of the adhesive tape 9 to secure the battery module 10. In this case, after the protective sheet is disposed on both sides of the battery module and the thermally contracting tapes are wound around the battery module; the thermally contracting tape is contracted by heating to fasten the battery module.

The structure in which the unit cells 8 are connected in series is shown in FIGS. 3 and 4. However, with regard to these unit cells 8, either series or series-parallel cell connections may be used to increase the capacity of the battery. The assembled battery packs may be further connected in series or parallel.

Also, the structure of the battery pack is appropriately changed according to its use. The battery pack is preferably used in applications exhibiting excellent cycle performance when a large current is extracted. Specific examples of these applications include power sources for digital cameras, and power sources mounted on vehicles such as two- to four-wheel vehicles hybrid electric cars, two- to four-wheel electric cars and assist bicycles. The battery pack is preferably used for power sources mounted on vehicles.

According to the embodiment, a nonaqueous electrolyte battery having an excellent cycle life is provided and therefore a battery pack improved in cycle life can be provided.

EXAMPLES

Example 1

Production of a Negative Electrode

Particle of a titanium oxide compound ($TiO_2$) having a $TiO_2(B)$ structure was dipped in a tris(trimethylsilyl) phosphate solution. The solution was filtrated to separate the particle. Then the particle was dried. An electrode material was thus obtained. The specific surface area of the particle was 13.6 m²/g.

This electrode material, acetylene black and PVdF were dissolved in NMP in a ratio by weight of 100:10:10 to prepare a negative electrode slurry. This negative electrode slurry was applied to the surface of an aluminum foil and dried to obtain a negative electrode.

<Production of an Evaluation Cell>

The negative electrode produced above, a lithium metal as the counter electrode and a glass filter as a separator were used to produce a cell. The negative electrode and counter electrode were put in a three-pole type glass cell under the argon atmosphere in such a manner that the both faced each other with a separator being interposed therebetween and a reference electrode made of a lithium metal was inserted in such a manner as to be in contact with neither the negative electrode nor the counter electrode.

Each of the negative electrode, counter electrode and reference electrode was connected with the terminal of the glass cell and a nonaqueous electrolyte was poured into the glass cell. The glass cell was sealed in the condition that the separator and electrode were sufficiently impregnated with the nonaqueous electrolyte.

In the Example 1, as the nonaqueous electrolyte, a solution was used which was prepared by dissolving 1.0 mol/L of $LiPF_6$ as an electrolyte in a mixed solvent obtained by mixing ethylene carbonate (EC) with diethyl carbonate (DEC) in a ratio by volume of 1:2.

Example 2

Production of a Negative Electrode

An evaluation cell was produced in the same manner as in Example 1 except that a titanium oxide compound having a $TiO_2(B)$ structure, acetylene black, PVdF and tris(trimethylsilyl) phosphate were dissolved in NMP in a ratio by weight of 100:10:10:2 to prepare a negative electrode slurry.

Example 3

A titanium oxide compound having a $TiO_2(B)$ structure, acetylene black and PVdF were dissolved in NMP to prepare a negative electrode slurry. This negative electrode slurry was applied to the surface of an aluminum foil and dried to obtain a negative electrode.

A mixed solvent was prepared by mixing ethylene carbonate (EC) with diethyl carbonate (DEC) in a ratio by volume of 1:2. A nonaqueous electrolyte was prepared by dissolving $LiPF_6$ in a concentration of 1.0 mol/L and tris(trimethylsilyl) phosphate in a concentration of 2% by mass in the mixed solvent.

An evaluation cell was produced in the same manner as in Example 1 by using the negative electrode and nonaqueous electrolyte prepared above.

Example 4

An evaluation cell was produced in the same manner as in Example 3 except that tris(trimethylsilyl) borate was used in place of tris(trimethylsilyl) phosphate to prepare a nonaqueous electrolyte.

Example 5

An evaluation cell was produced in the same manner as in Example 3 except that tris(triethylsilyl) phosphate was used in place of tris(trimethylsilyl) phosphate to prepare a nonaqueous electrolyte.

Example 6

An evaluation cell was produced in the same manner as in Example 3 except that tris(triethylsilyl) borate was used in place of tris(trimethylsilyl) phosphate to prepare a nonaqueous electrolyte.

Example 7

An evaluation cell was produced in the same manner as in Example 3 except that tris(butyldimethylsilyl) borate was used in place of tris(trimethylsilyl) phosphate to prepare a nonaqueous electrolyte.

Comparative Example 1

A titanium oxide compound having a $TiO_2(B)$ structure, acetylene black and PVdF were dissolved in NMP to prepare a negative electrode slurry. This negative electrode slurry was applied to the surface of an aluminum foil and dried to obtain a negative electrode.

A nonaqueous electrolyte was prepared by dissolving $LiPF_6$ in a concentration by volume of 1.0 mol/L in a mixed solvent obtained by mixing ethylene carbonate (EC) with diethyl carbonate (DEC) in a ratio by volume of 1:2.

An evaluation cell was produced in the same manner as in Example 1 by using the negative electrode and nonaqueous electrolyte prepared above.

Comparative Example 2

A mixed solvent was prepared by mixing ethylene carbonate (EC) with diethyl carbonate (DEC) in a ratio by volume of 1:2. A nonaqueous electrolyte was prepared by dissolving $LiPF_6$ in a concentration by volume of 1.0 mol/L and further vinylene carbonate in an amount of 2% by mass in the mixed solvent.

An evaluation cell was produced in the same manner as in Comparative Example 1 except that the nonaqueous electrolyte prepared above was used.

Comparative Example 3

An evaluation cell was produced in the same manner as in Comparative Example 2 except that fluoroethylene carbonate was used in place of vinylene carbonate to prepare a nonaqueous electrolyte.

Comparative Example 4

An evaluation cell was produced in the same manner as in Comparative Example 2 except that vinylethylene carbonate was used in place of vinylene carbonate to prepare a nonaqueous electrolyte.

(Charge-Discharge Test)

Using each evaluation cell of Examples 1 to 7 and Comparative Examples 1 to 4, a charge-discharge cycle was repeated 25 and 50 times (charge/discharge operation is performed in one cycle) to examine the resistance increase ratio.

The charge-discharge was carried out in the following condition; charge-discharge rate: 20 mA/g and 200 mA/g and voltage range: 1.0 to 3.0 V.

Figure 5:
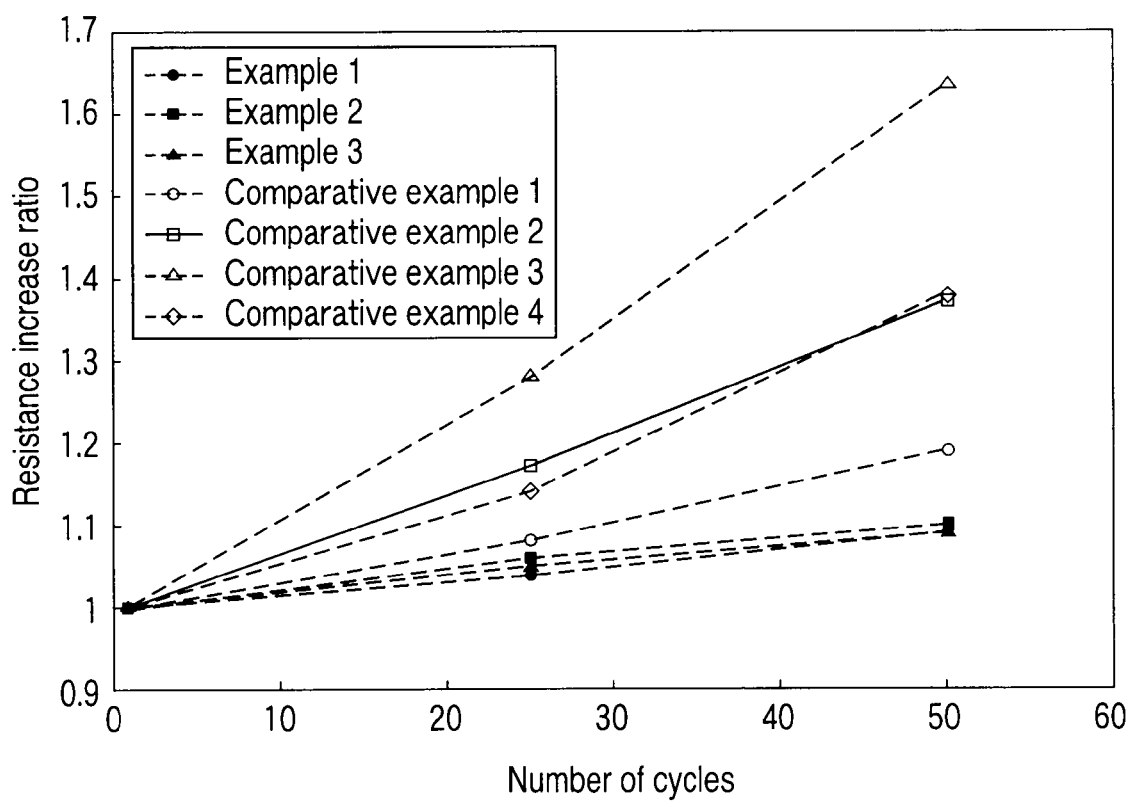
FIG. 5 is a graph showing the increase ratio in each resistance of Examples 1 to 3 and Comparative Examples 1 to 4.

The evaluation cell was made to discharge from fully charged state at current densities of 20 mA/g and 200 mA/g to calculate d.c. resistance value ($R_1$) from the cell voltage after discharged for 10 seconds. Also, resistance values ($R_{25}$ and $R_{50}$) after 25 cycles and 50 cycles were likewise measured to calculate the increase ratio of resistance ($R_{25}/R_1$ and $R_{50}/R_1$). The results are shown in Table 1. Also, a graph showing the increase ratio in each resistance of Examples 1 to 3 and Comparative Examples 1 to 4 is shown in FIG. 5.

(Time-of-Flight Type Secondary Ion Mass-Analysis Method)

Each evaluation cell of Examples 1 to 7 and Comparative Examples 1 to 4 after 50 charge-discharge cycles were finished was subjected to time-of-flight type secondary ion mass-analysis method. The surface of the active material was measured in Example 1 and the surface of the negative electrode was measured in other Examples and Comparative Examples. The results are shown in Table 1.

TABLE 1

|  | $I_1/I_2$ | $R_{25}/R_1$ | $R_{50}/R_1$ |
| --- | --- | --- | --- |
| Example 1 | 3.92 | 1.04 | 1.09 |
| Example 2 | 3.30 | 1.06 | 1.10 |
| Example 3 | 2.13 | 1.05 | 1.09 |
| Example 4 | 2.21 | 1.03 | 1.11 |
| Example 5 | 1.99 | 1.04 | 1.10 |
| Example 6 | 2.02 | 1.06 | 1.12 |
| Example 7 | 1.34 | 1.05 | 1.11 |
| Comparative Example 1 | 0.24 | 1.08 | 1.19 |
| Comparative Example 2 | 0.19 | 1.17 | 1.37 |
| Comparative Example 3 | 0.32 | 1.28 | 1.63 |
| Comparative Example 4 | 0.54 | 1.14 | 1.38 |

The ratios $I_1/I_2$ of peak intensities of Examples 1 to 7 were all 1 or more, whereas the ratios of $I_1/I_2$ of peak intensities of Comparative Examples 1 to 4 are all less than 1. The fact shows that the ratio $I_1/I_2$ of peak intensities becomes 1 or more when any one of the electrode material, electrode, and nonaqueous electrolyte comprises the compound having a trialkylsilyl group.

Also, each of Examples 1 to 7 has a lower resistance increase ratio than each of Comparative Examples 1 to 4, showing that the increase in resistance after charge-discharge cycles are finished is limited when the compound having a trialkylsilyl group is comprised in any one of the electrode material, electrode, and nonaqueous electrolyte.

Comparative Example 2 is a type using a nonaqueous electrolyte containing vinylene carbonate which is reported to have the effect of restraining the formation of a coating film in the case of using a carbonaceous negative electrode. Because the resistance increase ratio of Comparative Example 2 is higher than that of Comparative Example 1, it is shown that the effect of vinylene carbonate, that is, the effect of limiting the formation of a coating film cannot be obtained in the battery using a titanium oxide compound having a $TiO_2(B)$ structure as the active material.

Comparative Example 3 is a type containing fluoroethylene carbonate in a nonaqueous electrolyte. The resistance increase ratio of Comparative Example 3 was significantly higher than that of each of Comparative Examples 1, 2 and 4. This suggests that an inorganic coating film containing LiF and the like is excessively formed by the action of fluorine contained in fluoroethylene carbonate.

Comparative Example 4 is a type containing vinylethylene carbonate in a nonaqueous electrolyte. This Comparative Example 4 exhibited almost the same resistance increase ratio as Comparative Example 2. This shows that the effect of restraining the formation of a coating film cannot be obtained even by vinylethylene carbonate.

Comparative Example 5

An evaluation cell was produced in the same manner as in Example 1 except that lithium titanate was used in place of the titanium oxide compound having a $TiO_2(B)$ structure.

Comparative Example 6

An evaluation cell was produced in the same manner as in Example 2 except that lithium titanate was used in place of the titanium oxide compound having a $TiO_2(B)$ structure.

Comparative Example 7

An evaluation cell was produced in the same manner as in Example 3 except that lithium titanate was used in place of the titanium oxide compound having a $TiO_2(B)$ structure.

(Charge-Discharge Test)

Using each evaluation cell of Comparative Examples 5 to 7, a charge-discharge test was carried out in the same manner as above to calculate the increase ratio of resistance. The results are shown in Table 2.

TABLE 2

|  | $R_{25}/R_1$ | $R_{50}/R_1$ |
| --- | --- | --- |
| Comparative Example 5 | 1.00 | 1.01 |
| Comparative Example 6 | 1.00 | 1.01 |
| Comparative Example 7 | 1.00 | 1.01 |

Comparative examples 5 to 7 all have very low resistance increase ratio after the predetermined cycle test.

(Time-of-Flight Type Secondary Ion Mass-Analysis Method)

Each evaluation cell of Comparative Examples 5 to 7 after 50 charge-discharge cycles were finished was subjected to time-of-flight type secondary ion mass-analysis method. In the analysis method, the surface of the negative electrode was measured. As a result, the ratio ($I_1/I_2$) of peak intensities each of Comparative Examples 5 to 7 were all less than 0.1.

From Comparative Examples 5 and 6, it is considered that since tris(trimethylsilyl) phosphate was not acted on the surface of lithium titanate, trialkylsilyl group was not detected.

With regard to Comparative Example 7, an excessive coating film is not formed because the surface of lithium titanate has a low solid acidity. It is also considered that since tris(trimethylsilyl) phosphate was not acted on the surface of lithium titanate, trialkylsilyl group was not detected.

Because no trialkylsilyl group was detected in Comparative Examples 5 to 7, the low resistance increase ratio of Comparative Examples 5 to 7 is not caused by the trialkylsilyl group. It is therefore shown that the effect of limiting the increase in resistance due to the formation of a coating film containing a trialkylsilyl group is obtained in a battery using a titanium oxide compound having a $TiO_2(B)$ structure.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electrode material comprising:
    an active material comprising a titanium oxide compound having a monoclinic titanium dioxide crystal structure; and
    a compound which exists on a surface of the active material and has a trialkylsilyl group represented by the formula (I):

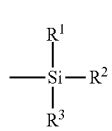

(I)

wherein, $R^1$, $R^2$ and $R^3$, which may be the same or different, respectively represent an alkyl group having 1 to 10 carbon atoms;
    wherein the compound having the trialkylsilyl group is at least one selected from phosphoric acid compounds containing the trialkylsilyl group and boric acid compounds containing the trialkylsilyl group; and
    when a surface of the electrode material is measured by time-of-flight type secondary ion mass-analysis method, a peak intensity ratio ($I_1/I_2$) satisfies the equation (II):

$$3.30 \leq I_1/I_2 \qquad (II)$$

wherein $I_1$ is a peak intensity of $Si(CH_3)_3^+$ and $I_2$ is a peak intensity of $Ti^+$.

2. A battery electrode comprising:
    an active material comprising a titanium oxide compound having a monoclinic titanium dioxide crystal structure; and
    a compound with a trialkylsilyl group represented by the formula (I):

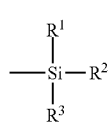

(I)

wherein, $R^1$, $R^2$ and $R^3$, which may be the same or different, respectively represent an alkyl group having 1 to 10 carbon atoms;
    wherein the compound having the trialkylsilyl group is at least one selected from phosphoric acid compounds containing the trialkylsilyl group and boric acid compounds containing the trialkylsilyl group; and
    when a surface of the electrode material is measured by time-of-flight type secondary ion mass-analysis method, a peak intensity ratio ($I_1/I_2$) satisfies the equation (II):

$$3.30 \leq I_1/I_2 \qquad (II)$$

wherein $I_1$ is a peak intensity of $Si(CH_3)_3^+$ and $I_2$ is a peak intensity of $Ti^3$.

3. A nonaqueous electrolyte battery comprising:
    a negative electrode comprising an active material which comprises a titanium oxide compound having a monoclinic titanium dioxide crystal structure;
    a positive electrode; and
    a nonaqueous electrolyte,
    wherein the nonaqueous electrolyte comprises a compound having a trialkylsilyl group represented by the formula (I):

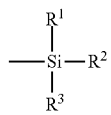

(I)

wherein, $R^1$, $R^2$ and $R^3$, which may be the same or different, respectively represent an alkyl group having 1 to 10 carbon atoms;
    wherein the compound having the trialkylsilyl group is at least one selected from phosphoric acid compounds containing the trialkylsilyl group and boric acid compounds containing the trialkylsilyl group; and
    when a surface of the electrode material is measured by time-of-flight type secondary ion mass-analysis method, a peak intensity ratio ($I_1/I_2$) satisfies the equation (II):

$$3.30 \leq I_1/I_2 \qquad (II)$$

wherein $I_1$ is a peak intensity of $Si(CH_3)_3^+$ and $I_2$ is a peak intensity of $Ti^+$.

4. A battery pack comprising the nonaqueous electrolyte battery according to claim 3.

5. A battery pack comprising the electrolyte battery according to claim 2.

6. The electrode material according to claim 1, wherein the compound selected from the phosphoric acid compounds containing the trialkylsilyl group and boric acid compounds containing the trialkylsilyl group exists in a surface of a primary particle of the active material.

7. The electrode material according to claim 1, wherein a specific surface area of the titanium oxide compound is in a range from 5 m²/g to 100 m²/g.

* * * * *